United States Patent [19]

Matuura et al.

[11] Patent Number: 4,795,889

[45] Date of Patent: Jan. 3, 1989

[54] AUTOMATIC BILL REFILLING METHOD FOR BILL RECYCLE MODULE USING CUSTOMER SENSOR

[75] Inventors: Nobuhiko Matuura, Asahi; Kunio Usijima, Seto; Tetsuo Goto, Asahi, all of Japan

[73] Assignee: Hitachi, Ltd., Tokyo, Japan

[21] Appl. No.: 897,405

[22] Filed: Aug. 18, 1986

[30] Foreign Application Priority Data

Aug. 30, 1985 [JP] Japan .............................. 60-189700

[51] Int. Cl.[4] ........................ G06F 15/30; G06F 15/24

[52] U.S. Cl. .................................... 235/379; 209/534; 235/375; 235/385

[58] Field of Search ........................ 209/534; 194/206; 235/379, 380, 375, 376, 382, 385, 381; 364/401, 408, 478, 479

[56] References Cited

U.S. PATENT DOCUMENTS 4,365,700 12/1982 Arimoto et al. .................... 194/206
4,420,751 12/1983 Paganini et al. .................... 235/379
4,511,794 4/1985 Imamichi ............................ 209/534
4,524,268 6/1985 Fukatsu ............................... 235/379

FOREIGN PATENT DOCUMENTS 57-41765 3/1982 Japan .................................. 235/379
58-105378 6/1983 Japan .................................. 235/379
58-121477 7/1983 Japan .................................. 235/379
60-73781 4/1985 Japan .................................. 235/379
60-142469 7/1985 Japan .................................. 235/379

*Primary Examiner*—Raymond F. Cardillo
*Assistant Examiner*—Robert A. Weinhardt
*Attorney, Agent, or Firm*—Antonelli, Terry & Wands

[57] ABSTRACT

In an automatic teller machine having a bill recycle module, when a deficiency detector detects a bill box to be deficient in bills, the operation of supplying bills from a refilling cashbox to the bill box is initiated provided that a customer sensor detects no person in front of the machine. The bill supplying operation continues as long as no person is detected until the number of the bills in the bill box reaches a predetermined value. Whenever a person is detected, the bill supplying operation is interrupted and the machine becomes again ready to accept a transaction. The bill supplying operation thus interrupted is resumed when the customer sensor ceases to detect a person.

7 Claims, 3 Drawing Sheets

AUTOMATIC BILL REFILLING METHOD FOR BILL RECYCLE MODULE USING CUSTOMER SENSOR

BACKGROUND OF THE INVENTION

The present invention relates to an automatic teller machine, and more particularly concerns an automatic bill refilling method for a bill recycle module provided for an automatic teller machine when few bills remain in a corresponding bill box of the bill recycle module.

A money receiving and dispensing mechanism is often called a bill recycle module when the mechanism is of the type wherein the bill boxes or cases for storing the deposited bills are also used as the source of bills which are to be dispensed. A bill recycle module and an example of an automatic bill refilling method for the bill recycle module were disclosed in U.S. Pat. No. 4,365,700 which was granted to Arimoto et al. on Dec. 28, 1982. According to the method disclosed, the operation of automatically refilling a pertinent bill box with bills of the corresponding denomination is started when the automatic teller machine for which the module is provided is in none of the modes of setting, resetting, deposit and withdrawal, and is repeated until the number of bills in the bill box reaches a prescribed value. Therefore, according to this method, interruption by the bill refilling operation of a transaction which is being executed at the time it is detected that a bill box is deficient in bills can be avoided. However, once the bill refilling operation is started, no further transaction can be executed during the course of this operation, and any users standing in line have to wait for the completion of the operation before they may execute their transactions.

SUMMARY OF THE INVENTION

It is the object of the invention to provide a method of automatically refilling a bill box of a bill recycle module in an automatic teller machine with bills of the corresponding denomination without delaying the start of the succeeding transaction.

According to the invention, when a deficiency detector detects that a bill box is deficient in bills of the corresponding denomination, the operation of refilling the bill box with the bills is started by supplying the bills from a cashbox which is previously charged with bills, provided that a customer sensor does not sense the existence of any customer. On the other hand, whenever the customer sensor senses the existence of a customer, the bill refilling operation is withheld so that the automatic teller machine is restored to a condition wherein it is ready to accept a further transaction. Therefore, according to the invention, the bill box can be refilled with the corresponding bills without keeping customers waiting for the completion of the bill refilling operation.

The above and other objects, features, and advantages of the present invention will be clearly understood from the following descriptions taken in conjunction with the accompanying drawings.

DETAILED DESCRIPTION OF THE PREFERRED EMBODIMENT

Figure 1:
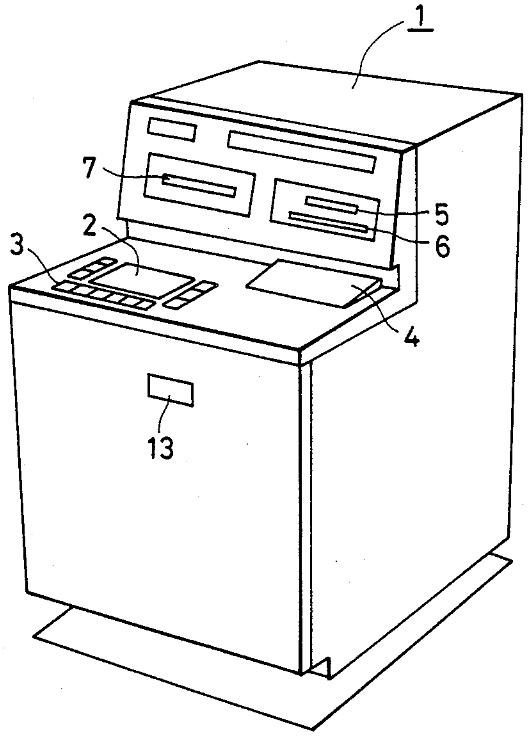
FIG. 1 is a perspective view of an example of an automatic teller machine to which the method according to the invention is applicable.

FIG. 1 shows the external appearance of an example of an automatic teller machine to which the present invention is applicable. The automatic teller machine (ATM) 1 has an operation guidance display 2, a group of operation buttons 3 including transaction select buttons and numeric buttons for inputting amounts of money and personal code numbers, a bill recycle module (BRM) 4 for receiving and dispensing bills (only the cover for the bill inlet-outlet of the module is shown in FIG. 1), a card reader-writer 5 for processing cards, a receipt printer 6 for printing and issuing receipts, and a bankbook printer 7 for printing information on bankbooks. Further, the ATM 1 is provided with a customer sensor 13 for detecting whether or not there is a person in front of the ATM 1 by the use of infrared rays, supersonic waves, and the like.

Figure 2:
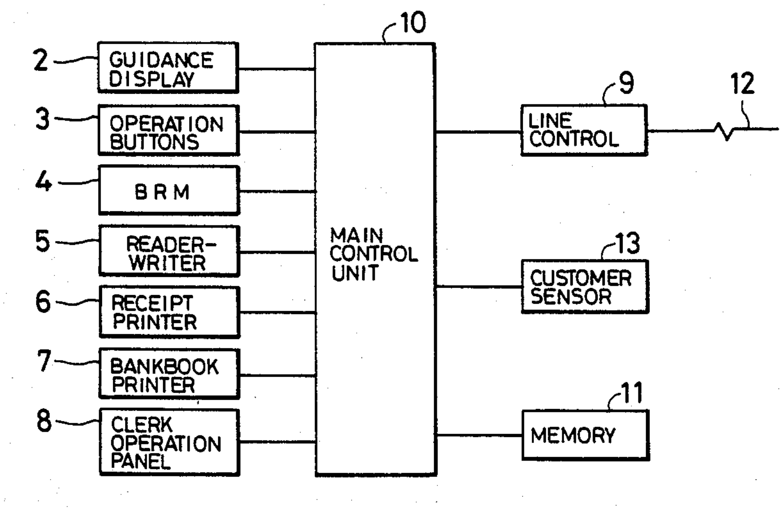
FIG. 2 is a block diagram schematically showing the internal arrangement of the machine of FIG. 1.
Figure 3:
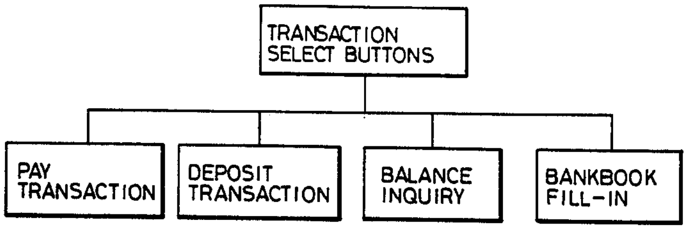
FIG. 3 is diagram illustrating transactions selected by means of transaction select buttons of the machine of FIG. 1.

FIG. 2 is a block diagram showing the internal arrangement of the ATM 1. In FIG. 2, blocks designated by reference numbers 2 through 7 and 13 correspond, respectively, to components designated by the same numbers in FIG. 1. A clerk operation panel 8 is provided with a group of operation buttons for clerk operations such as transaction start direction and totalization direction, as well as displays for indicating the condition of the ATM and the monetary amount stored. A line control unit 9 is adapted to exchange information with a central processor (not shown in the drawing) via a communication line 12. A memory 11 stores various data relating to transaction processing. A main control unit 10 includes a micro processor which allows it to control the above-mentioned components and thus to process transactions. As shown in FIG. 3, the transaction select buttons in the group of operation buttons 3 are pushed selectively so as to execute the desired transaction, i.e. pay or withdrawal transaction, deposit transaction, balance inquiry, or bankbook fill-in or updating.

Figure 4:
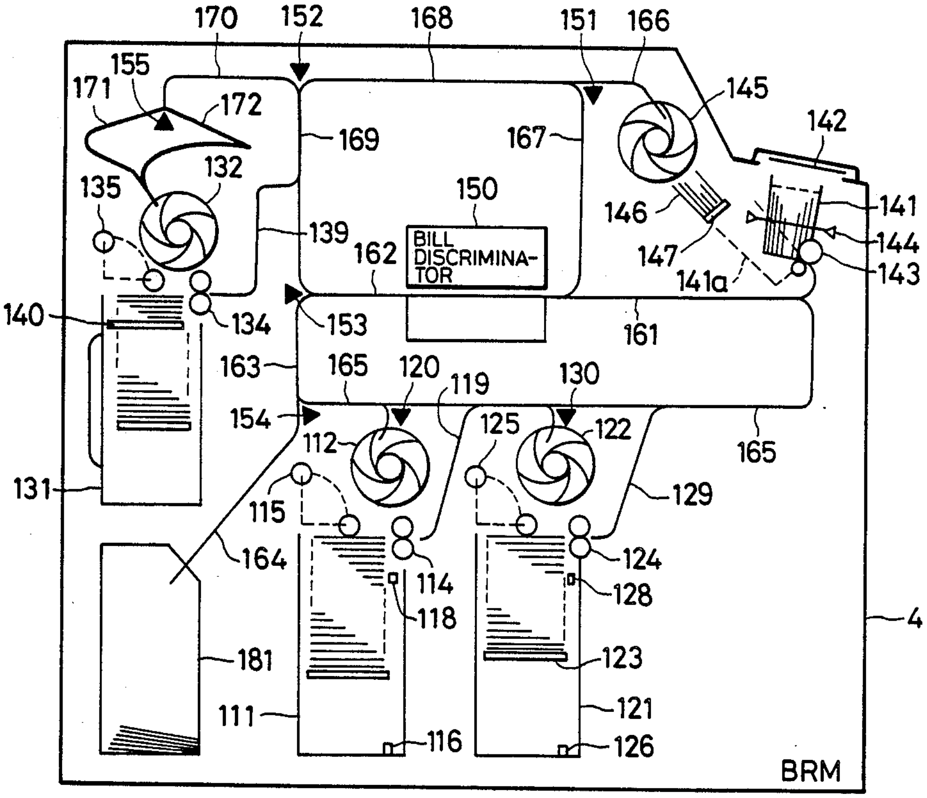
FIG. 4 is a schematic side view of a bill recycle module provided for the machine of FIG. 1.

FIG. 4 shows the bill recycle module (BRM) 4 in detail. When the bill boxes are to be loaded with an initial stock of bills before starting the daily business, a cashbox 131 is taken out of the module 4 for charging the cashbox 131 with stock bills of various denominations in a mixed manner, and after charging, the cashbox 131 is returned to its position. Then, the bills in the cashbox 131 are picked up one by one by a pick-up roller 135, drawn out by a feed roller 134, and are led through transport paths 139, 169, 168, and 167 to a bill discriminator 150. The bills are then led through transport paths 162, 163, 165, and further through either a wing wheel 112 or a wing wheel 122, depending upon the result of the discrimination, and are finally stored in a ¥ 1000 box 111 or a ¥10000 box 121. During this initial setting, a deposit temporary stacker 140, to be described later, is held in such a position that the stacker 140 will not be an obstacle to the picking-up of the bills from the cashbox 131. In FIG. 4, triangles 120, 130, and 151 to 155 represent gates for selecting transport paths for the bills. Bills of denominations other than ¥1000 and Y10000 and indiscriminatable bills are stored in a reject box 181 through a transport path 164. Meanwhile, the main control unit 10 counts the respective numbers of the classified and stored bills.

In a pay or withdrawal transaction, after a bill receptacle 141 is rotated to a position 141*a* indicated by the broken line in FIG. 1, ¥10000 bills in the ¥10000 box 121 are picked up one by one by a pick-up roller 125, drawn out by a feed roller 124, and are led through a transport path 129, the transport path 165, a transport path 161, the bill discriminator 150, the transport paths 162, 169, 168, a transport path 166, and a wing wheel 145 to a pay temporary stacker 146. Indiscriminatable bills and overlapping bills, if there are any, are transported to the reject box 181. Subsequently, Y1000 bills in the Y1000 box 111 are picked up one by one by a pick-up roller 115, drawn out by a feed roller 114, and are led through a transport path 119 and through the same transport paths as the ¥10000 bills to the pay temporary stacker 146. Meanwhile, the main control unit 10 calculates the amount of the ¥10000 and ¥1000 bills stacked in the pay temporary stacker 146. When required numbers of bills have been stacked in the stacker 146, a stopper 147 of the stacker 146 opens to drop the stacked bills into the bill receptacle 141*a* which is then rotated back to the initial position 141, and a shutter 142 is then opened. When a sensor 144 detects that the customer has received the bills, the shutter 142 is closed, thereupon terminating the operation for the pay transaction.

In a deposit transaction, when the shutter 142 is opened and bills are inserted into the receptacle 141, the sensor 144 detects this fact, causing the shutter 142 to close and the feed roller 143 to roll. The inserted bills are led one by one through the transport path 161 to the bill discriminator 150 which discriminates the denominations of the bills and also discriminates whether the bills are laid face up or face down. Then, the ¥1000 bills, the ¥5000 bills, and the ¥10000 bills are led through the transport paths 162 and 169, a transport path 170, and either a transport path 171 or a transport path 172, depending on whether the bills are face up or face down. After being made the same side up, the bills are then stacked in the deposit temporary stacker 140 through a wing wheel 132. Bills incapable of being discriminated are separated at the gate 152 and then stacked in the pay temporary stacker 146. Meanwhile, the main control unit 10 calculates the amount of the bills stacked in the deposit temporary stacker 140. When the sensor 144 detects that the bill receptacle 141 contains no more bills, the bill receptacle 141 is rotated to receive the indiscriminatable bills from the pay temporary stacker 146, nnd thereafter the receptacle 141 is rotated to the initial position. Then, the indiscriminatable bills in the receptacle 141 are processed in the same manner as above, and after this process, the indiscriminatable bills which have been stacked in the pay temporary stacker 146 again as a result of this retry are returned to the customer.

At this stage, the operation guidance display 2 indicates the total amount of bills stacked in the deposit temporary stacker 140. If the customer selects a "cancel" button from among the various operation buttons 3, the bills in the deposit temporary stacker 140 are sent out by the pick-up roller 135 and the feed roller 134, and transported to the pay temporary stacker 146 to be inserted into the bill receptacle 141*a*, and are returned to the customer, thereupon terminating the operation for the deposit transaction. On the other hand, if the customer pushes a "confirm" button, the main control unit 10 operates to send the transaction data from the line control unit 9 to the central processing unit via the communication line 12. On the basis of this transaction data, the central processing unit updates the customer information file, and sends a return message to the main control unit 10. Having received the message, the main control unit 10 then executes the updating and returning of the bankbook and/or the customer's card.

Thereafter, the module 4 operates to store the deposited bills. More specifically, the bills in the deposit temporary stacker 140 are transported by the pick-up roller 135 and the feed roller 134 through the same transport paths as in the initial setting, and are subjected to discrimination by the discriminator 150. Then in accordance with the discrimination result, 1000 bills are stored in the 1000 box 111 and 10000 bills are stored in the ¥10000 box. Bills of ¥5000 are stored in the reject box 181. On this occasion, if the ¥1000 box 111 and/or the ¥10000 box 121 is full (which condition is detected by limit switches 116 and 126, respectively), bills which would normally be stored in the corresponding box(es) are sent to the reject box 181.

When it is desired to collect bills held in the bill boxes for the purpose of inspection, bills in the Y10000 box 121 and bills in the ¥1000 box 111 are successively stacked in the cashbox 131 through the transport paths 165 and 161, the bill discriminator 150, the transport paths 162, 169, 170, and 171, and th wing wheel 132. During this operation, the deposit temporary stacker 140 is held in a position that does not hinder the operation. Indiscriminatable bills are sent to the reject box 181.

Figure 5:
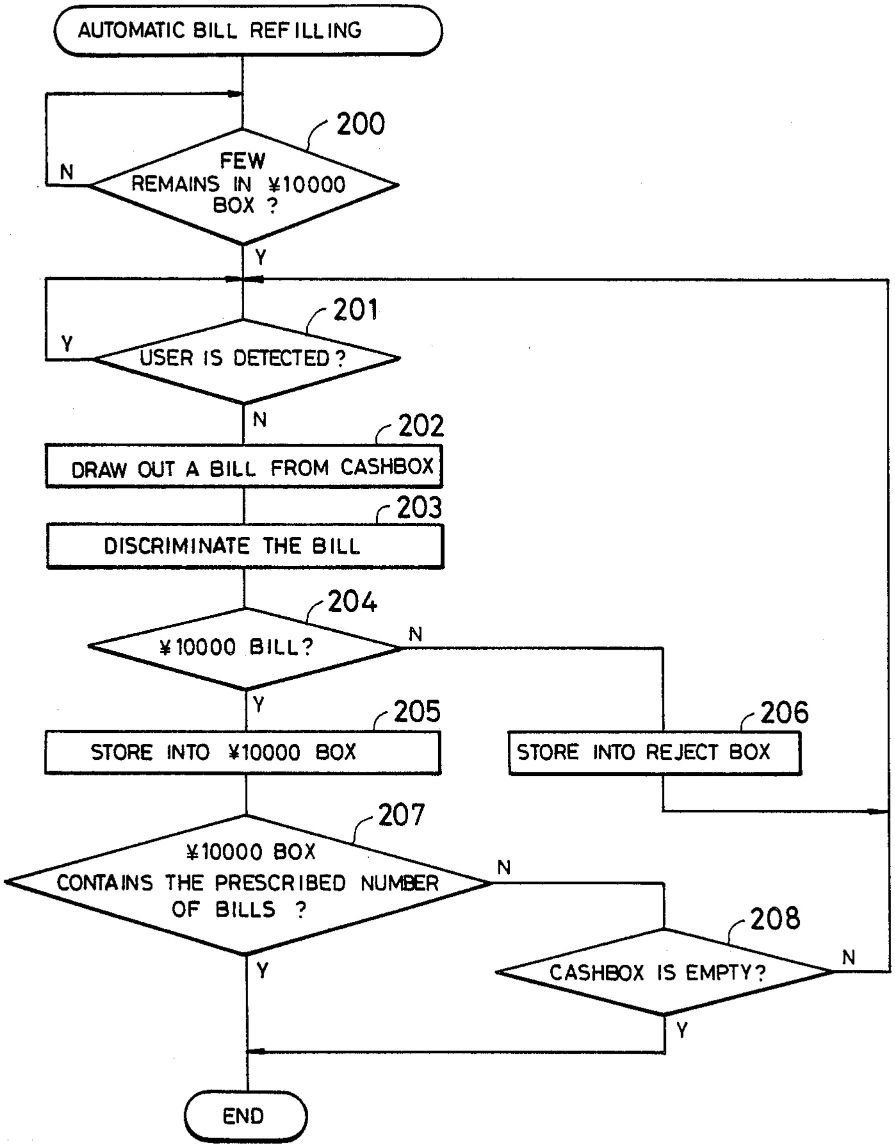
FIG. 5 is a flow chart showing an embodiment of the bill refilling method according to the invention.

Next, an embodiment of the bill refilling method according to the invention is described. In this description, it is supposed first, for instance, that too few bills remain in the ¥10000 bill box 121. Such a condition of deficiency of the ¥10000 bill box 121 is detected by the operation of a limit switch 128 caused by a sufficient length of upward movement of a push plate 123. Alternatively, deficiency conditions of bill boxes may be detected from the output of counter means which counts the numbers of bills in the respective bill boxes. The sequence of refilling the bill box which is detected to be deficient in bills is as follows, as shown in the flow chart of FIG. 5. The cashbox 131 is previously charged with stock bills.

When the deficiency condition is detected (step 200), the output of the customer sensor 13 is checked (step 201), and if the sensor 13 detects the existence of any user, the refilling operation is postponed until no user is detected by the sensor 13. When it is judged that there is no user, the bill refilling operation is then started. That is, in the module 4, the pick-up roller 135 is urged toward stacked bills in the cashbox 131, and rotated in the counter-clockwise direction so as to thrust a bill on top of the stack of bills to the feed roller 134. On this occasion, the deposit temporary stacker 140 is kept in a position not to hinder the picking-up of the bill from the cashbox 131. The feed roller 134 sends the picked-up bill to the transport path 139 (step 202). This bill is then transported through the transport paths 169, 168, and 167 to pass the bill discriminator 150 which discriminates the denomination of the bill (steps 203 and 204). If the bill is identified as a ¥10000 bill, the gates 153, 154, 120, and 130 are controlled so that the bill is led through the transport paths 162, 163, and 165 to the wing wheel 122 which is rotating in the counter-clockwise direction so as to stack the the bill in the ¥10000 box 121 (step 205). On this occasion, the pick-up roller 125 is held in the upper position. On the other hand, if the bill is identified as a bill other than a ¥10000 bill, the gate 154 is switched so that the bill is stored in the reject box 181 through the transport path 164 (step 206).

The above operatio is repeated, and when it is judged that the number of the bills in the y10000 box has reached a predetermined value, e.g., a half of the volume of the box 121 (step 207), the bill refilling operation is terminated. Such a state in which the refilling operation should be terminated can easiyy be detected by a limit switch (not shown in the drawing), similar to the limit switch 128, which is fitted at a suitable height in the 10000 box 121. Alternatively, the main control unit 10 may count the bills fed to the ¥10000 box 121 and judge that the box has been refilled with the predetermined number of bills to terminate the bill refilling operation. The bill refilling operation is also terminated when the cashbox 131 has run out of previously stocked bills (step 208) while the ¥10000 box has not yet been refilled completely.

Previous to the start of every repetition of the refilling cycle the output of the customer sensor 13 is examined (step 201). Then, if it is judged that there exists a user, the bill refilling operation is interrupted, and the automatic teller machine 1 is therefore restored to its normal operation mode in which the machine is ready to accept any transaction. The bill refilling operation which has thus been interrupted is resumed as soon as the customer sensor 13 ceases to detect a user in front of the automatic teller machine 1.

On the other hand, a deficiency condition of the Y10000 box 111 is detected by a limit switch 118 and thereafter a similar sequence of steps as above are taken, whereby bills identified as ¥10000 bills by the bill discriminator 150 are stacked in the ¥10000 box 111 through the wing wheel 112.

We claim:

1. An automatic bill refilling method for an automatic teller machine including at least a bill handling module having a plurality of first bill boxes for respective bill denominations, a second bill box containing bills for refilling, deficiency detecting means for detecting deficiency of bills in each of said first bill boxes, and customer sensor means for detecting existence of a customer in front of said machine, said method comprising the steps of:

detecting deficiency of bills in one of said first bill boxes; and supplying bills successively from said second bill box to said one of said first bill boxes after detecting said deficiency, only when said customer sensor means detects that no customer exists in front of said machine.

2. An automatic bill refilling method as claimed in claim 1, wherein said supplying step includes the step of interrupting the supplying of bills when said customer sensor means detects the existence of a customer in front of said machine so as to set said machine in a state in which a normal transaction can be accepted.

3. An automatic bill refilling method as claimed in claim 2, wherein said supplying step further includes the step of resuming the supplying the bills when said customer detecting means again detect that no customer exists in front of said machine.

4. An automatic bill refilling method as claimed in claim 1, further comprising the step of, terminating the supplying of bills when the amount of bills contained in said one of said first bill boxes reaches a predetermined value.

5. An automatic bill refilling method as claimed in claim 1, wherein said second bill box contains bills of different denominations, and said supplying step includes the step of selecting bills of a denomination corresponding to said one of said first bill boxes.

6. An automatic bill refilling method as claimed in claim 1, wherein said second bill box is also used for loading said first bill boxes with an initial stock of bills.

7. An automatic bill refilling method as claimed in claim 1, wherein said second bill box is also used for collecting bills from said first bill boxes.

* * * * *